US010716022B2

(12) United States Patent
Ganu et al.

(10) Patent No.: US 10,716,022 B2
(45) Date of Patent: Jul. 14, 2020

(54) SYSTEMS AND METHODS FOR CALCULATING UPLINK PATHLOSS IN A WLAN

(71) Applicant: Hewlett Packard Enterprise Development LP, Houston, TX (US)

(72) Inventors: Sachin Ganu, San Jose, CA (US); Gaurav Patwardhan, San Jose, CA (US); Eldad Perahia, Park City, UT (US); Dongwoon Hahn, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/046,940

(22) Filed: Jul. 26, 2018

(65) Prior Publication Data

US 2020/0037183 A1   Jan. 30, 2020

(51) Int. Cl.
*H04W 24/08* (2009.01)
*H04W 52/36* (2009.01)
(Continued)

(52) U.S. Cl.
CPC ......... *H04W 24/08* (2013.01); *H04W 52/365* (2013.01); *H04B 17/318* (2015.01);
(Continued)

(58) Field of Classification Search
CPC ... H04W 24/08; H04W 52/365; H04W 84/12; H04W 88/08; H04B 17/318; H04B 17/336
(Continued)

(56) References Cited

U.S. PATENT DOCUMENTS 6,978,151 B2   12/2005  Choi et al.
8,472,383 B1   6/2013   Banerjea et al.
(Continued)

FOREIGN PATENT DOCUMENTS

EP   1973255 A1      9/2008
WO   20061110492 A2  10/2006
(Continued)

OTHER PUBLICATIONS

Kaltakis, D. et al., Capacity of Cellular Uplink with Multiple Tiers of Users and Path Loss, (Research Paper), Jan. 30, 2008, 5 Pgs.
(Continued)

*Primary Examiner* — Yemane Mesfin
*Assistant Examiner* — Intekhaab A Siddiquee
(74) *Attorney, Agent, or Firm* — Sheppard Mullin Richter & Hampton LLP

(57) ABSTRACT

Systems and methods for calculating uplink pathloss in a wireless local area network are provided. Uplink pathloss between an access point and client device operating in the wireless local area network can be calculated based on determining an effective maximum transmit power. Based on the effective maximum transmit power, and known uplink power headroom, a current transmit power of the client device can be determined. Based on the current transmit power of the client device, uplink pathloss can be determined. If the operating conditions and/or characteristics of the client device and/or wireless local area network change, the uplink pathloss may be re-evaluated.

20 Claims, 11 Drawing Sheets

(51) Int. Cl.
*H04W 88/08* (2009.01)
*H04W 84/12* (2009.01)
*H04B 17/336* (2015.01)
*H04B 17/318* (2015.01)
*H04W 52/24* (2009.01)

(52) U.S. Cl.
CPC ........... *H04B 17/336* (2015.01); *H04W 84/12* (2013.01); *H04W 88/08* (2013.01)

(58) Field of Classification Search
USPC .......................................................... 370/252
See application file for complete search history.

(56) References Cited

U.S. PATENT DOCUMENTS

| | | | |
|---|---|---|---|
| 8,929,291 | B2 | 1/2015 | Kim et al. |
| 9,661,592 | B2 | 5/2017 | Seol et al. |
| 2014/0126509 | A1 | 5/2014 | You |
| 2015/0146654 | A1 | 5/2015 | Chu et al. |
| 2016/0037459 | A1 | 2/2016 | Swartz et al. |
| 2016/0128004 | A1* | 5/2016 | Lee .................... H04W 52/146 370/311 |
| 2016/0249351 | A1 | 8/2016 | Wang et al. |
| 2017/0070961 | A1* | 3/2017 | Bharadwaj ............ H04L 5/0053 |
| 2017/0289926 | A1* | 10/2017 | Sutskover ........... H04W 52/242 |
| 2019/0246312 | A1* | 8/2019 | Kim ...................... H04W 28/02 |

FOREIGN PATENT DOCUMENTS

| | | |
|---|---|---|
| WO | 20131067934 A1 | 5/2013 |
| WO | WO-2013060016 | 5/2013 |
| WO | WO-2015092416 | 6/2015 |
| WO | WO-2017156211 | 9/2017 |
| WO | WO-2018064009 | 4/2018 |

OTHER PUBLICATIONS

Aruba, "802.11AX: White Paper", May 30, 2018, 38 pages.
Partial European Search Report received for EP Patent Application No. 19185410 8, dated Dec. 10, 2019, 15 pages.
Turkka et al., "Using LTE Power 1-7 Headroom Report for Coverage Optimization", Vehicular Technology Conference (VTC Fall), IEEE, Sep. 5, 2011, pp. 1-5.
Extended European Search Report received for EP Patent Application No. 19185418.8, dated Mar. 17, 2020, 15 pages.
Muharar et al., "Optimal Power Allocation for Multiuser Transmit Beamforming via Regularized Channel Inversion", IEEE, 2013, pp. 1393-1397.

* cited by examiner

| Channel | Max EIRP | Regulatory Domain |
|---|---|---|
| 36 | 19 | FCC |
| 149 | 21 | FCC |

FIG. 3B

| Client Device | Received RSSI | MCS | UPH | Max RSSI Achievable | Max MCS Achievable |
|---|---|---|---|---|---|
| CD 1 | -65 dBm | MCS 0 | 15 dB | -50 dBm | MCS 11 |
| CD 2 | -60 dBm | MCS 0 | 6 dB | -54 dBm | MCS 10 |
| CD 3 | -63 dBm | MCS 0 | 9 dB | -54 dBm | MCS 10 |
| CD 4 | -73 dBm | MCS 0 | 10 dB | -63 dBm | MCS 7 |
| CD 5 | -70 dBm | MCS 0 | 9 dB | -61 dBm | MCS 7 |
| CD 6 | -72 dBm | MCS 0 | 11 dB | -61 dBm | MCS 7 |

FIG. 4B

SYSTEMS AND METHODS FOR CALCULATING UPLINK PATHLOSS IN A WLAN

DESCRIPTION OF THE RELATED ART

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks. Wireless network communications devices (also referred to as stations or client devices), such as personal computers and mobile phones transmit data across wireless digital networks vis-à-vis WiFi APs, and cellular network APs, for example.

WLAN infrastructure elements or components in a WiFi network provide service to WLAN devices. In providing this service, RF characteristics of the links between the AP and client devices may be determined in order to optimize the transmission and/or receipt of data. These RF characteristics can include, for example, path loss and channel coefficients.

BRIEF DESCRIPTION OF THE DRAWINGS

The present disclosure, in accordance with one or more various embodiments, is described in detail with reference to the following figures. The drawings are provided for purposes of illustration only, and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

FIG. 3B illustrates an example table of the maximum transmit power capabilities of a client device across channels and regulatory domains.

FIG. 4B in an example table of the received RSSI, corresponding MCS rate, UPH value of a client device, calculated maximum achievable RSSI, and maximum achievable MCS rate.

Figure 1A:
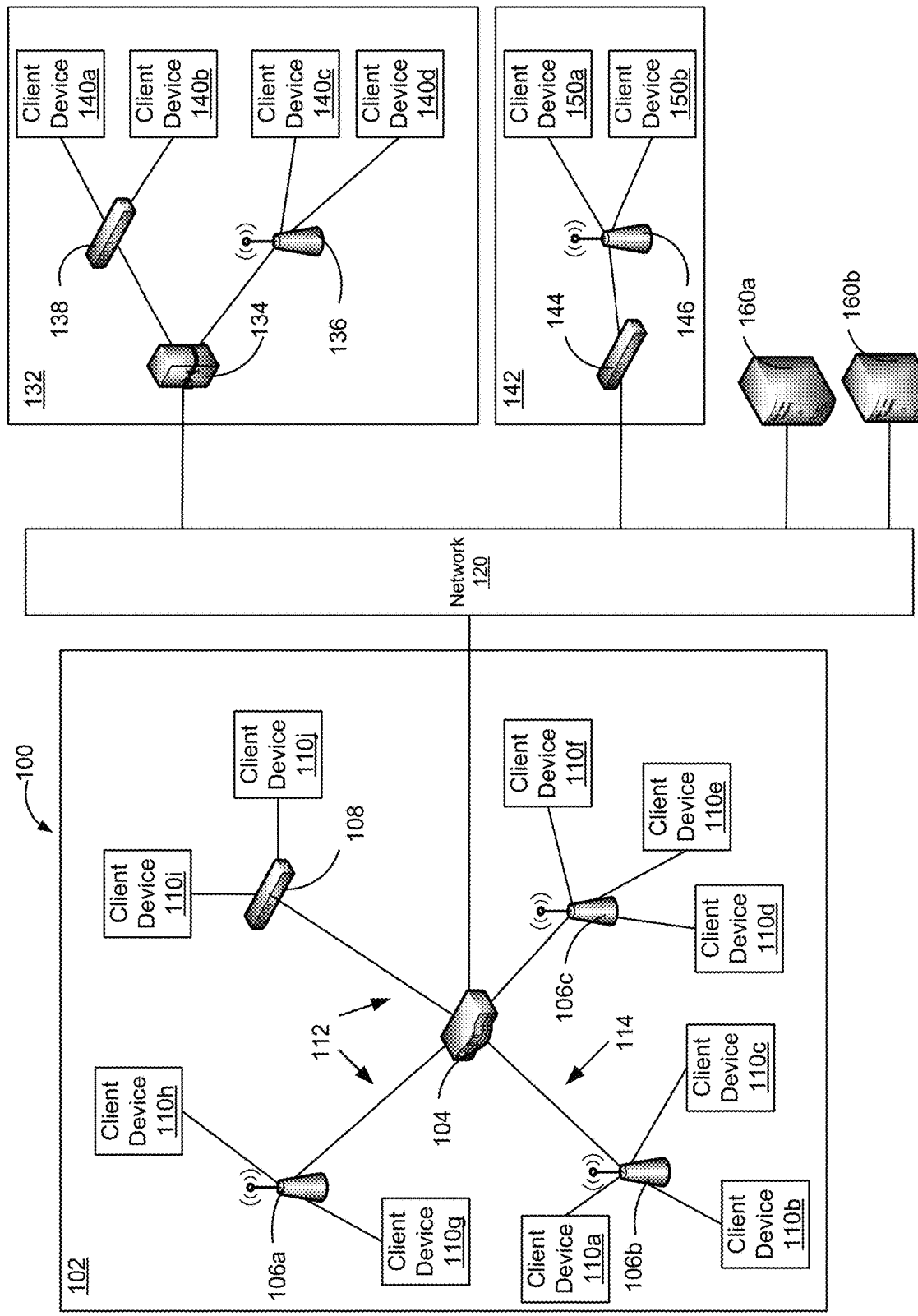
FIG. 1A is a schematic block diagram illustrating an example network configuration in which the technology described herein may be implemented.

The figures are not intended to be exhaustive or to limit various embodiments to the precise form disclosed. It should be understood that various embodiments can be practiced with modification and alteration.

DETAILED DESCRIPTION

Multi-User, Multiple-Input and Multiple Output (MU-MIMO) provides a mechanism for a wireless network device to transmit to multiple client devices at the same time. A wireless network device may be a network device, such as for example an AP, that provides wireless connectivity to a network. Without MU-MIMO enabled, the network device may have to transmit to each associated client device one at a time. With MU-MIMO, because the wireless network device is able to transmit to multiple client devices at the same time, the wireless network device is able to transmit more data more frequently. This can improve the rate of data being transmitted to some or all of the associated client devices. MU-MIMO is defined in the Institute of Electrical and Electronics Engineers (IEEE) 802.11 specification.

When employing MU-MIMO, a wireless network device may group two or more client devices, and transmit beam-formed signals to each group. MU-MIMO may be more efficient when a group of client devices that are to receive MU-MIMO transmissions are receiving frames with similar traffic characteristics. Because the network device is transmitting to all the client devices at the same time, the transmissions may be more efficient when the frames being transmitted are similar in size. Furthermore, the interval between MU-MIMO transmissions may be minimized when the network device receives incoming frames at about the same time.

In the upcoming 802.11ax High Efficiency WLAN standard, one manner in which the aforementioned efficiency may be achieved is by scheduling MU transmissions for both downstream (from an AP) and upstream (from client devices) transmissions. The scheduling of downstream MU transmissions has been addressed in the context of 802.11ac solutions that use MU channel sounding and beamforming to minimize the interference between different client devices that are part of the same MU transmission.

However, in the upstream or uplink (UL) direction, the grouping of client devices, as well as the selection of MCS (physical (PHY) layer rates) and a target RSSI value at the AP for each client device is an as-of-yet unsolved problem in the context of WLAN networks. It should be understood that RSSI can refer to a value representative of received signal strength or power level being received by a receive radio of an AP after antenna and possible pathloss.

Various embodiments of the present disclosure are directed to systems and methods of grouping compatible client devices for UL MU (simultaneous) traffic based on one or more criteria that can be used to define that grouping of compatible client devices. For example, a grouping of client devices can be based on one or more criteria including: compatibility of traffic to be transmitted from client devices; and similarity of device class or capability of client devices. In some embodiments, further refinement of a grouping can be achieved by grouping together client devices having the same or similar pathloss to the AP. It should be noted that in some cases, UL and downlink (DL) pathloss may be the same or similar, whereas in other cases, they may differ. Accordingly, in some embodiments, the calculation of pathloss between a client device and AP can be agnostic as to the transmission direction.

Once client devices are grouped, the aforementioned issue of MCS and target RSSI selection may be addressed. That is, various embodiments of the present disclosure are further directed to determining the MCS and target transmit power to be used by client devices for sending their data upstream to an AP(s) when they are part of the MU grouping in order to achieve a desired RSSI at the AP.

In some embodiments, the UL MCS may be updated based on feedback regarding packet reception success at the AP from each client device in a grouping that has transmitted packets in an UL MU transmission. For example, the AP can maintain/adjust UL packet delivery and/or UL MCS rates as a function of the packet data rate or packet error rate. For example, the AP can adjust the UL MCS as a function of DL single user (SU)/MU rates and UL channel quality.

Returning to the grouping of client devices based on pathloss, it should be understood that in the context of WLAN infrastructure providing service to WLAN devices, it is important for a network to be able to determine basic RF characteristics of links between an AP and client devices. Pathloss is an example of such an RF characteristic.

Conventional systems and methods infer pathloss on downstream or DL links/channels between an AP and client devices. For example, 802.11k beacon reports may allow an access point (AP) to receive feedback about the Signal-to-Noise Ratio (SNR) of a received beacon frame as heard by a client device. Using explicit channel sounding vis-à-vis the transmission of null data packets, APs can also obtain the SNR of different subcarriers as heard by client devices. While these techniques are useful for determining appropriate channel weights for downstream transmissions, there are drawbacks. For example, beacon reports are not implemented by most client devices since it is an optional feature, implementing channel sounding feedback can be expensive. Moreover, the pathloss of a link between an AP and a client device may not be symmetric due to differences in transmitter RF circuitries of the AP and the client device, as well as different multipath properties of the link. As of yet, there are no known mechanisms/techniques for determining UL pathloss.

Accordingly, various embodiments are directed to determining or calculating the UL pathloss between an AP and a client device. In some embodiments, a maximum transmit power capability across different channels of operation and across regulatory domains is determined. From this maximum power capability, an effective maximum transmit power capability can be derived. Client devices report their UL power headroom value to APs. Accordingly, at a lowest MCS rate (selected to stay within transmitter error vector magnitude (EVM) limits), a current transmit power of the client device can be calculated by subtracting the uplink power headroom value from the maximum effective transmit power of the client device. Pathloss in the uplink (from the client device to the AP) can then be calculated by subtracting a target RSSI value and an AP receive antenna gain from the current transmit power of the client device.

As alluded to above, UL pathloss can be used as a basis for grouping client devices together for applications such as UL multi-user multiple-input-multiple output (MU-MIMO) and UL orthogonal frequency-division multiple access (OFDMA) in the upcoming 802.11ax standard, where matching received RSSI at the AP improves detection likelihood. Other applications for which UL pathloss may be useful include, but are not limited to UL MCS determination for client devices by the AP, ranging, and client device steering.

FIG. 1A illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, that are in communication with the network 120.

The main office 102 may include a primary network, which can be referred to as a corporate network or a home network. The main office 102 network may be a private network. A private network can refer to a network that may include security and access controls, such that only certain users are authorized to access the private network. Authorized users may include, for example, employees of a company based in the main office 102.

In the illustrated example, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 may be operable to configure and manage network devices, such as at the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless APs 106a-c. Switches 108 and wireless APs 106a-c provide network connectivity to various client devices 110a-j. Using a connection to a switch 108 or AP 106a-c, a client device 110a-j is able to access network resources, including other devices on the (main office 102) network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, and the like.

Within the main office 102, a switch 108 is included as one example of a point of access to the network established in main office 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in main office 102 for client devices 110*a-h*. Each of APs 106*a-c* may be a combination of hardware, software, and/or firmware that is configured to provide wireless network connectivity to wireless client devices 110*a-h*. In the illustrated example, APs 106*a-c* can be managed and configured by the controller 104. APs 106*a-c* communicate with the controller 104 and the network over either wired 112 or wireless 114 connections.

The network configuration 100 may include one or more remote sites 132. A remote site 132 may be located in a different physical or geographical location from the main office 102. In some cases, the remote site 132 may be in the same geographical location, or possibly the same building, as the main office 102, but lacks a direct connection to the network located within the main office 102. Instead, remote site 132 may utilize a connection over a different network, e.g., network 120. A remote site 132 such as the one illustrated in FIG. 1A may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 is in direct communication with main office 102, such that client devices 140*a-d* at the remote site 132 access the network resources at the main office 102 as if these clients devices 140*a-d* were located at the main office 102. In such embodiments, the remote site 132 is managed by the controller 104 at the main office 102, and the controller 104 provides the necessary connectivity, security, and accessibility that enable the remote site 132's communication with the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the main office 102, such that the client devices 150*a-b* at remote site 142 access network resources at the main office 102 as if these client devices 150*a-b* were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a j*, 140*a-d*, 150*a-b* may request and access the multimedia content provided by the content servers 160*a-b*.

As alluded to above, client devices in a network, such as that embodied by network configuration 100, may be grouped together for purposes of simultaneous UL transmissions to an AP, such as AP 106*c*.

An OFDM symbol may be thought of as a basic building block of a WiFi transmission. That is, an OFDM symbol is a small segment in time of a modulated waveform of a subcarrier, carrying information. In 802.11ax, subcarrier spacing was changed to allow for OFDMA to extend to small sub-channels (defined in the standard), each sub-channel having at least one (but usually two) pilot subcarriers. With a 2 MHz minimum sub-channel size, a smaller subcarrier spacing loses a smaller percentage of the overall bandwidth to pilots. Moreover, the number of guard and null subcarriers across a channel can also be reduced as a percentage of the number of useable subcarriers, which in turn results in an increase in the effective data rate of a given channel.

OFDMA works by dividing a transmission across the frequency dimension, with pairs of devices assigned to transmit and receive in sub-channels or resource units (RUs) of a main RF channel. This allows an AP (in the downlink) to bundle multiple frames together in different sub-channels in a single transmit opportunity, while the APs associated client devices tune their respective radios to different sub-channels to receive their respective transmissions. In particular, an AP may assemble a number of frames for different client devices, and modulates them over a set of allocated sub-channels. Padding can be added to a frame when the frame is shorter than a longest frame of a bundle. In the uplink context, as alluded to above, an AP determines or calculates a grouping of client devices. The AP then signals when each client device should transmit and what sub-channel to use for its transmission.

DL MU-MIMO was introduced in 802.11ac, and extends the concepts of spatial diversity and beamforming to support simultaneous transmission from an AP to a plurality of client devices. MU-MIMO generally possible when propagation characteristics allow an AP to identify that a transmission optimized for one client device or grouping of client devices will not be heard at a significant signal strength by some other client device(s) and vice versa. Both multi-user modes, MU-MIMO and OFDMA allow for simultaneous bi-directional communication between an AP and multiple client devices. However, unlike DL MU-MIMO or DL OFDMA, UL MU-MIMO/OFDMA modes use a trigger frame allowing an AP to allocate MU-MIMO groups and OFDMA RUs to its associated client devices. The AP informs the client devices of the allocation. In turn, the AP polls its associated client device for their UL traffic requirements.

Figure 1B:
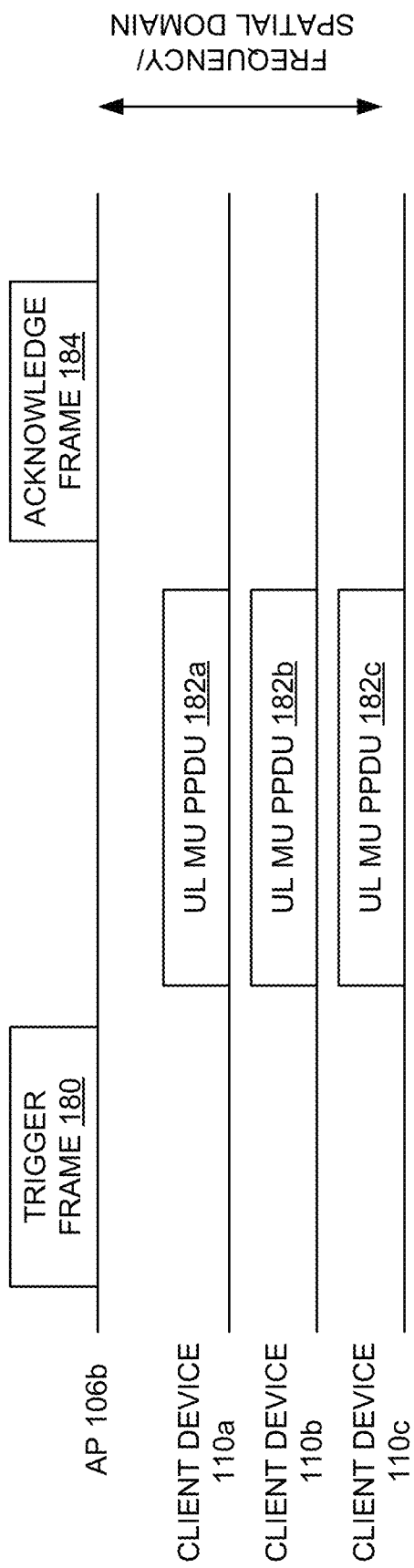
FIG. 1B illustrates an example Uplink Multi-User (UL MU) transmission scenario in accordance with various embodiments.

FIG. 1B illustrates an example UL MU scenario in accordance with various embodiments. As noted above, operating in an UL MU mode involves using a trigger frame in order to allow an AP to allocate MU-MIMO groups and OFDMA RUs to client devices associated with the AP. Once an allocation is made, an AP (such as AP 106b of FIG. 1A) or an AP controller (such as AP controller 104) transmits a trigger frame 180 soliciting the transmission of UL MU PHY Protocol Data Units (PPDUs) 182a-c from multiple client devices, e.g., client devices 110a-110c. That is, trigger frame 180 is used to inform client device 110a-c that they are part of a particular MU group scheduled for upstream transmissions along with a selected MCS and target RSSI (to be received at AP 106).

Accordingly, trigger frame 180 can be used for time synchronization purposes amongst the relevant MU client devices (in this case, client devices 110a-c) based on the end of the trigger frame 180. Additionally, frequency offset correction can be based on a common AP reference from trigger frame 180. Further still, trigger frame 180 can provide information regarding an appropriate duration and PPDU length of UL MU transmissions expected from client devices 110a-c, as well as information identifying client devices that are allowed to transmit, in this case, client devices 110a-c. In response to trigger frame 180, client devices 110a-c transmit their respective data packets, i.e., UL MU (OFDMA or MU-MIMO) PPDUs 182a-c to AP 106b using the appropriate/identified MCS and transmit power resulting in the target RSSI. This maximizes the likelihood that the data packets will be received successfully at AP 106b. AP 106b transmits an acknowledgment frame 184 in response to the UL MU PPDUs 182a-c received from client devices 110a-c.

In order to group client devices together for simultaneous UL MU transmissions, various embodiments can consider traffic compatibility of client devices and/or UL compatibility based on device class of client devices.

With respect to traffic compatibility, a plurality of client devices for UL MU transmissions can be grouped together based on the upstream traffic compatibility. In order to determine whether or not client devices have compatible upstream traffic, an AP (e.g., AP 106b) or an AP controller (e.g., AP controller 104) may leverage information contained in buffers status reports (BSRs) that are periodically sent from client devices (e.g., client devices 110a-c) to the AP or AP controller. Per the 802.11ax standard, information contained in BSRs may include queued traffic (i.e., queued UL data buffered in each respective client device) per access category (AC) information. In other words, each client device may transmit to an AP or AP controller, the status of its UL buffer queue and indicator(s) regarding one or more ACs or traffic identifiers (TIDs) to which the queued data belongs. It should be understood that data can be assigned, for example, to one of four ACs, AC0-AC3. The highest priority data (such as voice data that cannot withstand certain delays/latency) may be assigned to a first AC, e.g., AC0. A next highest priority data (such as video data) may be assigned to AC1. Data associated with another level of priority (such as best-effort quality of service (QoS)) may be assigned to AC2, and data associated with the remaining level of priority (such as background data) may be assigned to AC3. Of course, it should be understood that the various levels of priority can vary and/or other designations for those various levels of priority, as well as the corresponding AC levels may vary.

Figure 2A:
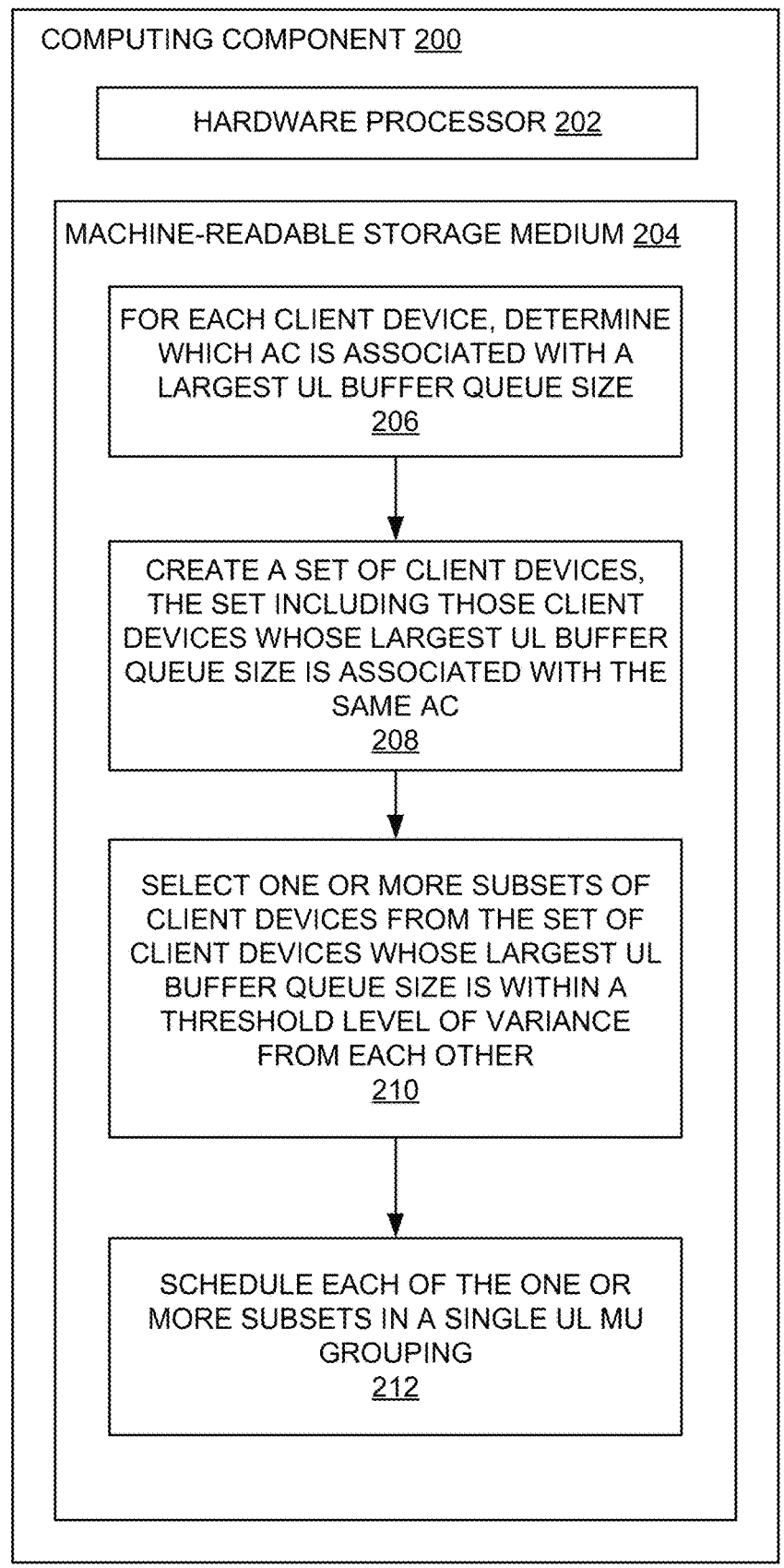
FIG. 2A is a block diagram of an example computing component for grouping client devices together based on UL traffic compatibility to schedule simultaneous UL MU transmissions in accordance with various embodiments.

FIG. 2A is a block diagram of an example computing component or device 200 for grouping client devices together based on access category to schedule simultaneous UL MU transmissions. Computing component 200 may be, for example, a server computer, a controller, or any other similar computing component capable of processing data. In the example implementation of FIG. 2A, the computing component 200 includes a hardware processor, 202, and machine-readable storage medium, 204. In some embodiments, computing component 200 may be an embodiment of an AP or AP controller, e.g., AP 106b or AP controller 104, respectively, of FIG. 1A.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-212, to control processes or operations for grouping client devices based on traffic compatibility. As an alternative or in addition to retrieving and executing instructions, hardware processor 202 may include one or more electronic circuits that include electronic components for performing the functionality of one or more instructions, such as a field programmable gate array (FPGA) or application specific integrated circuit (ASIC).

A machine-readable storage medium, such as machine-readable storage medium 304, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 202 may be a non-transitory storage medium, where the term "non-transitory" does not encompass transitory propagating signals. As described in detail below, machine-readable storage medium 202 may be encoded with executable instructions, for example, instructions 206-212, for client device grouping.

Hardware processor 200 may execute instruction 206 to determine, for each client device, which AC is associated with a largest buffer queue size. For example, hardware processor 200 may be an AP or AP controller that receives BSRs from each client device, as noted above. Hardware processor 200 may analyze or extract information from BSR frames to ascertain which AC (or AC identifier, ACI) associated with a client device corresponds to that client device's largest UL buffer queue, as well as what the UL buffer queue size is.

Hardware processor 200 may execute instruction 208 to create a set of client devices. This set of client devices may be created by including those client devices whose largest buffer queue size is associated with the same AC/ACI. That is, the client devices are filtered based on respective BSRs that indicate a largest UL buffer queue size being associated the same AC/ACI. For example, a first client device may have a largest UL buffer queue size of 5, where this largest UL buffer queue size of 5 is associated with data assigned to AC0 (the highest level of priority). A second client device may have a largest buffer queue size of 8, where this largest UL buffer queue size of 8 is also associated with data assigned to AC0. A third client device may have a largest buffer queue size of 7 that is also associated with data assigned to AC0. Hardware processor 200, upon executing instruction 208 may create a set of client devices including each of the first, second and third client devices given that each of their respective largest UL buffer queues hold data corresponding to the same AC/ACI, in this case, AC0.

Hardware processor 200 may execute instruction 210 so as to select one or more subsets of client devices from the above-described set of client devices whose largest UL buffer queue size is within a threshold level of variance from each other. That is, a threshold level of variance may be determined to capture or allow client devices whose largest UL buffer queue sizes are within 1 value of each other. In the above example, execution of instruction 210 may result in hardware processor 200 selecting the second and third client devices (whose largest UL buffer queue sizes are 8 and 7, respectively) as a subset of client devices. Because the first client device (whose largest UL buffer queue size is 5 falls outside the threshold level of variance), the first client device is not included as part of the selected subset.

Hardware processor 210 may execute instruction 212 to schedule each of the one or more subsets in a single UL MU grouping. That is, based on the results of executing instruction 210, hardware processor 210 (which may be an AP or AP controller) schedules the second and third client devices for transmission of their respective queued data simultaneously to the AP.

With respect to UL compatibility, a plurality of client devices for UL MU transmissions can be grouped together based on device class compatibility. That is, client devices can be designated by class. It should be understood that in the context of the 802.11 standard, class can refer to the fidelity of a client device's transmitter in terms of error vector magnitude (EVM) and/or frequency characteristics during transmission at a certain effective isotropic radiated power (EIRP). Frequency characteristics may include, but are not limited to frequency drift and phase noise. Client devices may advertise their capabilities (in terms of fidelity) to an AP vis-à-vis a client device's initial association request message. In the 802.11 standard, client devices capability can be identified as being "Class A" or "Class B." Generally speaking, Class A devices have better accuracy in terms of their EIRP and RSSI measurement at the AP. Alternatively, a client device's device class may be determined based on knowledge an AP may have (e.g., historical or otherwise) regarding a client device's model, type, and/or other information not necessarily received from a client device in an initial association request.

Figure 2B:
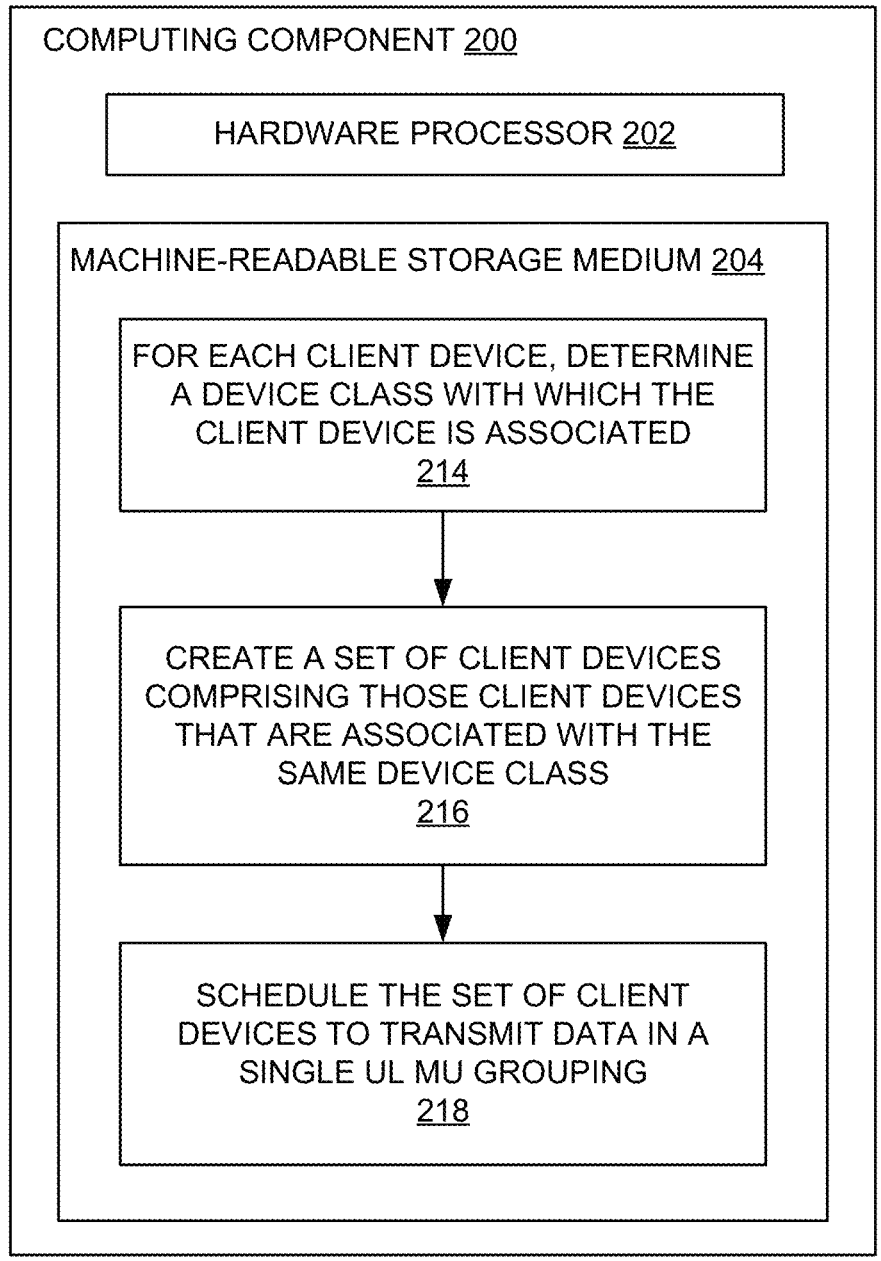
FIG. 2B is a block diagram of an example computing component for grouping client devices together based on device class to schedule simultaneous UL MU transmissions in accordance with various embodiments.

FIG. 2B is a block diagram of an example computing component 200 for grouping client devices together based on device class compatibility to schedule simultaneous UL MU transmissions. Computing component 200 may be the same as that illustrated in FIG. 2A or similar thereto. As illustrated in FIG. 2B, hardware processor 200 may execute instruction 214 to determine, for each client device, a device class with which the client device is associated. As noted above, in some embodiments client devices may be associated with one or two device classes indicative of a client device's transmitter fidelity.

Hardware processor 200 may execute instruction 216 to create a set of client devices. This set of client devices may be created by including those client devices that are associated with same device class. Hardware processor 200 may execute instruction 218 to schedule the set of client devices to transmit data in a single UL MU grouping.

For example, and in accordance with some embodiments, one type of "broad" filtering based on client device class can encompass client device classes that are known as not having high fidelity, e.g., Class B client devices. In some embodiments, a client device that does not have/utilize a high fidelity transmitter can translate into a situation where an AP cannot expect a deterministic signal from that client device, especially when trying to receive/sync all received signals at the AP. That is, in order to successfully decode UL transmissions at the AP, client devices should be matched in terms of their transmit EVM, frequency drifts and other transmissions distortions.

Accordingly, based on this broad filtering, an AP can choose to ignore those client devices without high fidelity (or sufficiently high fidelity) from UL transmissions. That is, these devices are not grouped with other client devices, and may be relegated to single UL transmissions. In other embodiments, these Class B or "lower" fidelity client devices can be grouped together. In turn, those client devices with the requisite fidelity, e.g., those client devices characterized as Class A client devices, may be grouped together for simultaneous UL MU transmissions.

It should be noted that the grouping of client devices based on traffic compatibility or class compatibility may be used exclusively. For example, an AP may schedule simultaneous UL MU transmissions for those client devices having compatible traffic to be transmitted upstream or for those client devices having compatible class designations. In some embodiments, however, an AP may schedule simultaneous UL MU transmissions for a group of client devices based on both traffic compatibility and client device class. For example, hardware processor 200 may determine a first grouping of client devices based on traffic compatibility, and from that first grouping of client devices, hardware processor 200 may further determine a second grouping (subset of the first group) of client devices based on class designation or vice versa. In some embodiments a weighting scheme can be used, where one grouping consideration may be weighted more heavily, e.g., given priority, over another grouping consideration. For example, weighting may be based on the number of outstanding packets queued for client devices. If the number of outstanding packets in a client device's transmission queue is larger than some given threshold, traffic compatibility may be weighted more heavily than device class, i.e., the compatibility of traffic amongst a group of client devices is prioritized over grouping based on device classes.

In some embodiments, to align upstream data packet transmissions from multiple client devices, it may be beneficial for those multiple client devices to have a similar pathloss to the AP. In this way, similar or tightly constrained MCSs (with respect to receive EVM, guard intervals, spatial streams, etc.), as specified by the AP at a desired RSSI level may be sustained. Thus, an initial grouping of client devices selected based on traffic compatibility and/or client device class may be further refined, e.g., a subset of the initial grouping can be identified/selected based on similar pathloss characteristics. For example, client devices whose pathloss to an AP is less than some determined pathloss threshold can be grouped together. In some embodiments, multiple pathloss thresholds may be defined and used as bases for grouping client devices. It should be understood that pathloss may be calculated for each client device of the initial grouping of client devices that are part of a current UL MU group.

Figure 3A:
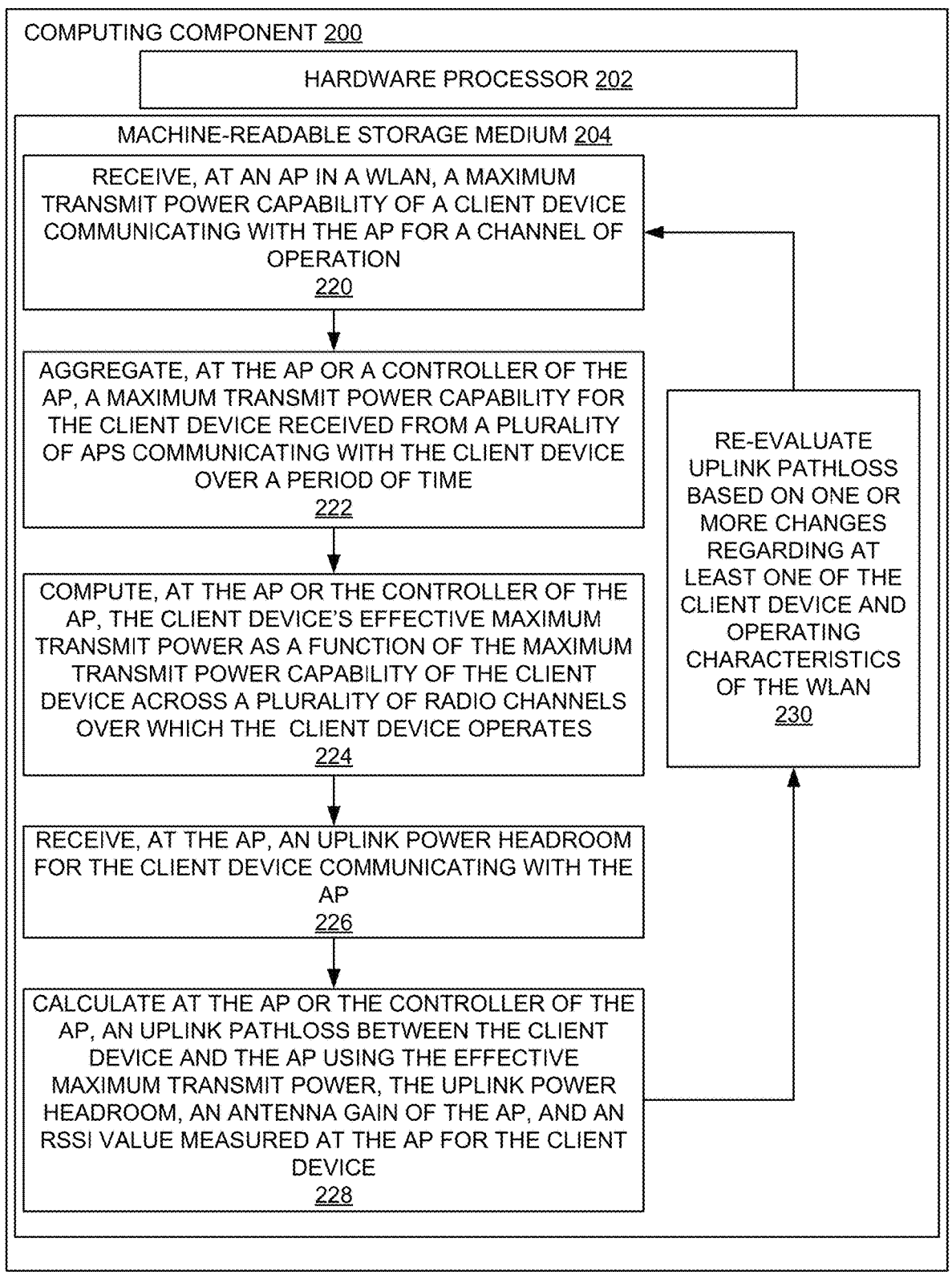
FIG. 3A is a block diagram of an example computing component for calculating pathloss between an AP and client device in accordance with various embodiments.

Various operating characteristics of an AP and a client device are determined and used to calculate the UL pathloss between the AP and the client device. FIG. 3A is a block diagram of an example computing component or device 200 for calculating pathloss between an AP and client device. In some embodiments, computing component 200 may be the same computing component as that illustrated in FIG. 2 and described above. In some embodiments, however, a different computing component or partition/part of computing component 200 may be used to determine pathloss as described herein. In some embodiments, hardware processor 202 is the same hardware processor 202 as that illustrated in FIG. 2, or in other embodiments, another hardware processor or portion of hardware processor 202 may be used. In some embodiments, machine-readable storage medium 204 is the same machine-readable storage medium as that illustrated in FIG. 2, but in other embodiments, another machine-readable storage medium or portion of machine-readable storage medium 204 may be used to store instructions 220-230.

As illustrated in FIG. 3A, hardware processor 202 may execute instruction 220 so that an AP (in a WLAN) can receive a maximum transmit power capability of a client device communicating with the AP for a channel of operation. That is, and in accordance with one embodiment, a maximum transmit power capability (referred to as $TX\_Max\_EIRP_{11h\ channel}$) of the client device across different channels of operation and across regulatory domains is determined. In particular, the transmit power capability of a client device can be determined by way of the power capability information that the client device advertises to an AP.

For example, client devices may advertise their respective power capability to an AP when the spectrum management feature (introduced in the 802.11h extension to the 802.11 standard) is enabled on the AP. Advertisement of a client device's maximum (and minimum) transmit power capability can occur in a frame of an association request sent by the client device to the AP. It should be understood that a client device's maximum transmit power capability may be different depending on one or more of the following: the channel over which the client device may be operating; the Unlicensed National information Infrastructure (U-NII) band over which the client device may be operating; and the regulatory domain in which the client device may be operating. In some embodiments, the maximum transmit power may be capped by the hardware limitations of a client device. Accordingly, hardware processor 202 may execute instruction 222 to aggregate, at the AP or a controller of the AP, a maximum transmit power capability for the client device received from a plurality of APs communicating with the client device over a period of time.

A table or other data structure may be used by WLAN infrastructure to maintain a record or listing of the maximum transmit power capabilities of a client device as seen by multiple APs across different channels, bands, and/or regulatory domains. This record or listing of the maximum transmit power capabilities of a client device may be built up for all relevant regulatory domains, channels, and/or bands, and may be created and/or maintained at the AP, the AP controller and/or some other, e.g., centralized data store FIG. 3B illustrates an example table of the maximum transmit power capabilities of a client device across channels and regulatory domains. For example, a client device, e.g., client device 110a of FIG. 1, may have a maximum transmit power (represented as Max EIRP) of 19 W when transmitting over channel 36 in a domain regulated by the US Federal Communications Commission (FCC). Over channel 149 of an FCC regulated domain, client device 110a may have a maximum transmit power of 21 W.

Returning to FIG. 3A, hardware processor 202 may execute instruction 224 to compute, at the AP or the controller of the AP, the client device's effective maximum transmit power as a function of the maximum transmit power capability of the client device across a plurality of radio channels over which the client device operates. That is, using (in this example), the set of per channel/per regulatory domain maximum transmit power capabilities of a client device, the effective maximum transmit power capability of that client device may be calculated in accordance with the following equation:

$$TX\_Max\_EIRP_{11h} = Min\{Tx\_Max\_EIRP_{11h\ channel}\}$$

It should be noted that in this example, selecting a minimum maximum transmit power among the set of maximum transmit power capabilities is one convenient method of determining a client device's effective maximum transmit power inasmuch. However, other methods of determining an effective maximum transmit power may be used. For example, an average or mean maximum transmit power of the set of maximum transmit power capabilities of the client device may be calculated and considered representative of the client device's effective maximum transmit power across channels/bands/regulatory domains.

Hardware processor 202 may execute instruction 226 in order to receive, at the AP, an uplink power headroom for the client device communication with the AP.

In the 802.11ax standard, a client device reports the UL Power Headroom (UPH) using the High Efficiency (HE) variant of the High Throughput (HT) control field in frames sent to APs. This HE variant of the HT control field is generally requested by an AP to coordinate its MU UL transmissions with other client devices. The UPH value can be described as the range within or to which a client device can increase its EIRP for a currently used MCS. In this way, the AP can be made aware of the UPH (referred to as $UL\_Headroom_{CD,MCS\_x}$) relative to a client device's current transmit power for its current MCS rate (MCS_x). UPH can be reflected with the following equation:

$$UL\_Headroom_{CD,MCS} = TX\_MAX\_EIRP_{CD,MCS} - TX\_CURRENT\_EIRP_{CD}$$

It can be assumed that the maximum transmit power of a client device at a given MCS ($TX\_MAX\_EIRP_{CD,MCS=0}$) is the same as the client device's maximum transmit power capability ($TX\_MAX\_EIRP_{11h}$) advertised in the client device's association request, described above. This is a reasonable assumption since it is expected that the client device will use the maximum transmit power allowed mostly at its lowest MCS rate to stay within specified transmit EVM limits, also alluded to above. Therefore, Equation 1 can be simplified as follows:

$$UL\_Headroom_{CD,MCS} = TX\_MAX\_EIRP_{11h} - TX\_CURRENT\_EIRP_{CD}$$

For the given client device, the current EIRP of the client device, using MCS 0 is calculated as follows:

$$TX\_CURRENT\_EIRP_{CD} = TX\_MAX\_EIRP_{11h} - UL\_Headroom_{CD,MCS=0}$$

It should be understood that for each MCS value or rate, the client device may have a different EIRP and UL headroom. As indicated above, the lowest MCS can be assumed to stay within the specified transmit EVM limits.

As set forth in the following equation, RSSI at the AP is a function of the current EIRP of the client device, the receive antenna gain of the AP and the pathloss between the client device and the AP, where $G\_ANT_{AP}$ is the receive antenna gain of the AP (known at the AP):

$$RSSI_{AP} = TX\_CURRENT\_EIRP_{CD} + G\_ANT_{AP} - \text{Path Loss}$$

Thus, because the current EIRP of the client device has been determined above, and a target RSSI and receive antenna gain of the antenna is known, the pathloss between the client device and the AP can be calculated as follows:

$$PathLoss_{CD\text{-}AP} = TX\_MAX\_EIRP_{11h} - UL\_Headroom_{CD,MCS=0} - RSSI_{AP} + G\_ANT_{AP}$$

Thus, hardware processor 202 may execute instruction 228 in order to calculate, at the AP, a UL pathloss between the client device and the AP using the effective maximum transmit power, the uplink headroom, an antenna gain of the AP, and an RSSI value measured at the AP for the client device.

It should be understood that the above-described pathloss determination may be performed for each of a plurality of client devices. As also noted above, the pathloss may be used as part of a client device grouping determination to support simultaneous UL MU-MIMO or UL OFDMA transmissions. Thus, determined pathloss can be used to generate a data set across multiple APs, which can be "data mined" and consolidated across various geographies. It should also be noted that a benefit of the described method of determining pathloss is that this it is implementable with 802.11ax-compliant devices because UPH feedback and power capability reporting are both supported by 802.11ax client devices.

In some embodiments, it may be beneficial to re-evaluate the pathloss between a client device and AP. That is, a particular pathloss is relevant for a certain amount of time. Accordingly, it may be beneficial to re-evaluate pathloss involving an AP based on differences involving, but not limited to, client device type, traffic flow, upstream signal-to-noise ratio (SNR), virtual beacon report changes (e.g., changes in upstream SNR to multiple APs, and/or external inputs that classify a client device as being mobile rather than non-mobile, etc. Again, pathloss determinations can be collected to create a data set that can be data mined and used to optimize certain transmission modes, e.g., UL MU-MIMO/OFDMA, network performance, etc.

Accordingly, hardware processor 202 may execute instruction 230 to re-evaluate pathloss based on one or changes regarding at least one the client device and operating characteristics of the network, i.e., WLAN. For example, an AP or AP controller embodied by hardware processor 204 can re-initiate the pathloss determination by re-executing instructions 220-228 when the upstream SNR from a client device changes by an amount equal to or exceeding a particular upstream SNR threshold.

Once an AP or AP controller has determined a grouping of client devices whose queued data is to be transmitted simultaneously (based on one or more of UL traffic compatibility, client device class, and pathloss similarity), the AP or AP controller may determine link or PHY compatibility. In other words, the received power from each client device at the AP should be balanced so that the AP can successfully decode each transmission from each client device of a group despite the transmission being sent simultaneously to the AP.

In accordance with various embodiments, UL MCS and a target RSSI may be selected in order to further subdivide or generate a subgroup of client devices based on PHY compatibility. That is, an UL MCS rate can be selected for each client device to use for its triggered UL transmission, and a target transmit power of each client device can be selected to achieve the target RSSI at the AP. Once the UL MCS rate and target RSSI are selected for each client device, this information may be transmitted to the appropriate client device.

Figure 4A:
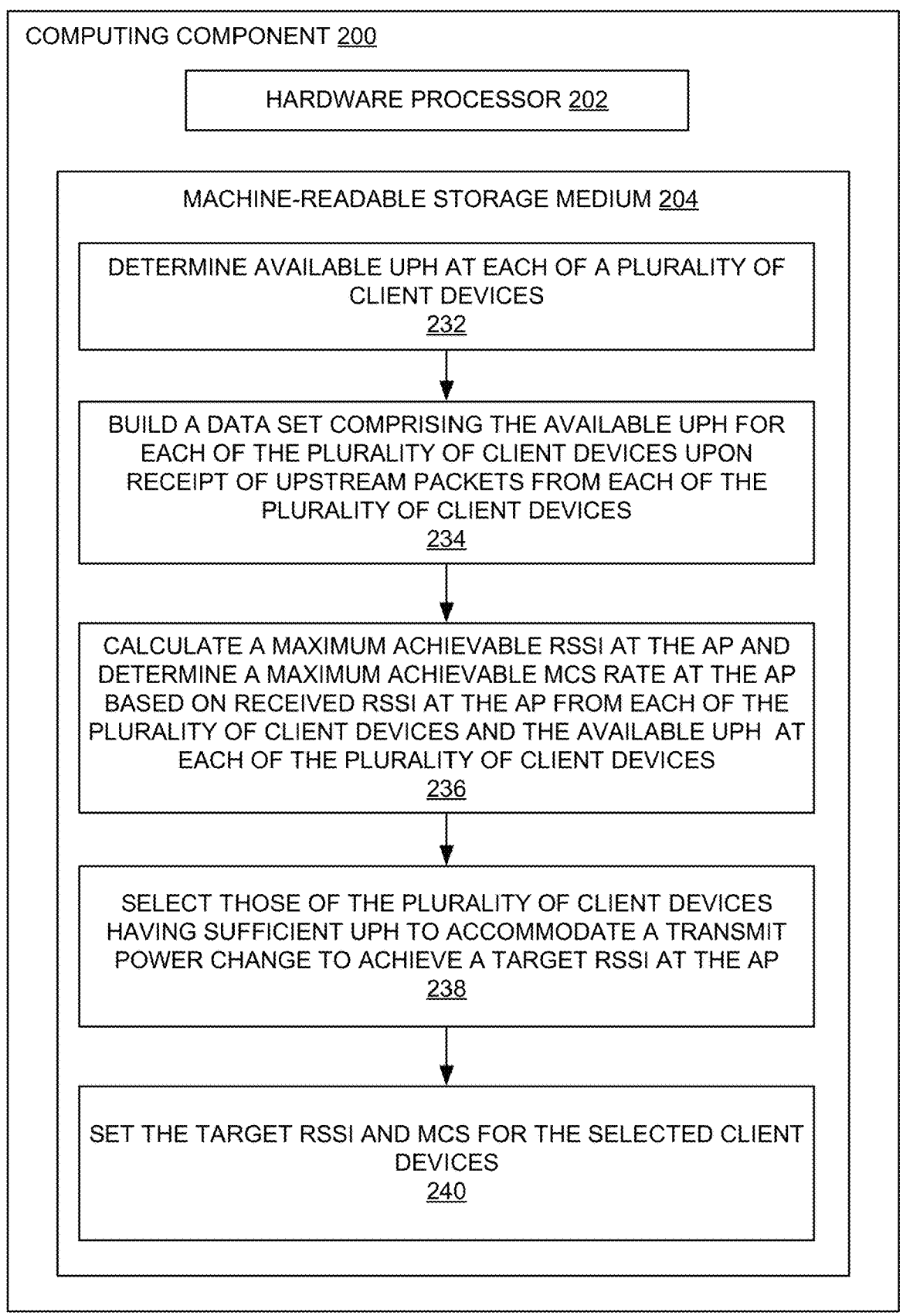
FIG. 4A is a block diagram of an example computing component for selecting a UL modulation coding scheme (MCS) and target received signal strength indication (RSSI) in accordance with various embodiments.

FIG. 4A is a block diagram of an example computing component or device 200 for selecting an UL MCS and target RSSI in accordance with various embodiments. As previously noted, in some embodiments, computing component 200 may be the same computing component as that illustrated in FIGS. 2 and/or 3A and described above. In some embodiments, however, a different computing component or partition/part of computing component 200 may be used to determine pathloss as described herein. In some embodiments, hardware processor 202 is the same hardware processor 202 as that illustrated in FIGS. 2 and/or 3A, or in other embodiments, another hardware processor or portion of hardware processor 202 may be used. In some embodiments, machine-readable storage medium 204 is the same machine-readable storage medium as that illustrated in FIGS. 2 and/or 3A, but in other embodiments, another machine-readable storage medium or portion of machine-readable storage medium 204 may be used to store instructions 232-240.

In some embodiments, hardware processor 202 may execute instruction 232 to determine the available UPH at each of a plurality of client devices. In order to make this determination, an AP may start with an initial pathloss estimate by requesting a UL transmission at an MCS rate of 0. By requesting the UL transmission at the lowest MCS rate, the AP can determine the available UPH at the client device (i.e., the amount by which the transmit power of the client device can be increased).

In some embodiments, hardware processor 202 may execute instruction 234 to build a data set comprising the available UPH for each of the plurality of client devices upon receipt of upstream packets (at the AP) from each of the plurality of client devices. For example, the AP (or AP controller) may build of table of UPH values per MCS rate from each client device associated with the AP.

In some embodiments, hardware processor 202 may execute instruction 236 to calculate a maximum achievable RSSI at the AP and a maximum achievable MCS rate at the AP based on received RSSI at the AP from each of the plurality of client devices and the available UPH at each of the plurality of client devices. That is, for each client device associated with the AP, the AP or AP controller can calculate the difference between the received RSSI at the AP and the UPH to arrive at a maximum achievable RSSI. A maximum achievable MCS rate can be determined based on the maximum achievable RSSI (i.e., upon receiving the aforementioned upstream packets from each client device at each MCS rate, the AP (or AP controller) can calculate the maximum MCS that can be supported by the maximum achievable RSSI. It should be understood that the calculated maximum achievable RSSI corresponds to the aforementioned target RSSI at the AP.

FIG. 4B in an example listing (in table form) of the received RSSI at the AP, the corresponding MCS rate of 0, the UPH value of the client device, the calculated maximum achievable RSSI, and the maximum achievable MCS rate. In this example, for a first client device, CS 1, at an MCS rate of 0, the received RSSI at the AP based on an upstream packet transmission sent by CS 1 to the AP (pursuant to the AP's request) is −65 dBm. If the UPH of CD 1 is 15 dB, the maximum achievable RSSI is −65 dBm+15 dB, equals −50 dBm. Similar calculations can be performed for all the associated client devices, in this example client devices CD 2-6.

As illustrated in FIG. 4B, the calculated maximum achievable RSSI results in range of maximum achievable (supported) MCS rates from MCS 11 to MCS 7. It can be appreciated that if the AP or AP controller selects a target RSSI of −54 dBm (which is high enough to decode MCS rates of 10 or higher, the AP or AP controller can determine which client devices are able to achieve this RSSI given their respective UPH capabilities. In this way, client devices can be further grouped (after considering, e.g., UL traffic compatibility, client device class, and/or UL pathloss) and assigned a target RSSI and MCS rate.

Returning to FIG. 4A, hardware processor 202 may execute instruction 238 to select those of the plurality of client devices having sufficient UPH to accommodate a transmit power change to achieve a target RSSI at the AP. For example, the AP or AP controller may select an MCS rate of 10 and a target RSSI of −54 dBm (i.e., the minimum achievable amongst the group). Based on the aforementioned calculations, the AP/AP controller may select client devices CD1-3 to be a part of a first UL MU group. In some embodiments, the AP/AP controller may select an MCS rate of 9 and a target RSSI of −54 dBm) to allow for some signal margin, e.g., of about 3 dB for resiliency). Again, client devices CD 1-3 may be selected. The AP/AP controller may select an MCS rate of 7 and a target RSSI of −63 dBm. Accordingly, the AP/AP controller may select client devices CD 4-6 to be a part of a second UL MU group. A target RSSI can be derived based on a desired MCS, and for every desired MCS, a certain SNR budget for the receiver is needed. If a client device is unable to increase its power level because its UPH is less than the desired transmit power level increase, the client device may be excluded from the UL MU group. Such a client device(s) may be scheduled as part of another group (as noted above), or the client device(s) may be relegated to a single user transmission mode.

It should be noted that in the case of UL MU-MIMO, the entire bandwidth is used, whereas in the case of UL OFDMA, an AP/AP controller may further consider which sub-carrier group to assign to a group of client devices. It should be further noted that generally, those client devices assigned a higher MCS may be scheduled first, while those client devices assigned a lower MCS may be scheduled later. Typically, high MCS rates are preferable from the perspective of being able to reduce air time on a radio channel. That said, this may be dependent upon UPH, and MCS rates may be scaled down to whatever MCS is achievable for the signal level desired at the AP.

As noted above, client devices can be grouped according to one or more of UL traffic compatibility, client device class, and/or UL pathloss. Upon determining or arriving at such a grouping, those client devices in the grouping can be further filtered or subdivided into another subgroup(s) based on MCS rate and target RSSI. Accordingly, hardware processor 202 may execute instruction 240 to set the target RSSI and MCS for the selected client devices, i.e., the client devices of that subgroup(s) are assigned the target RSSI and MCS rate.

Figure 5A:
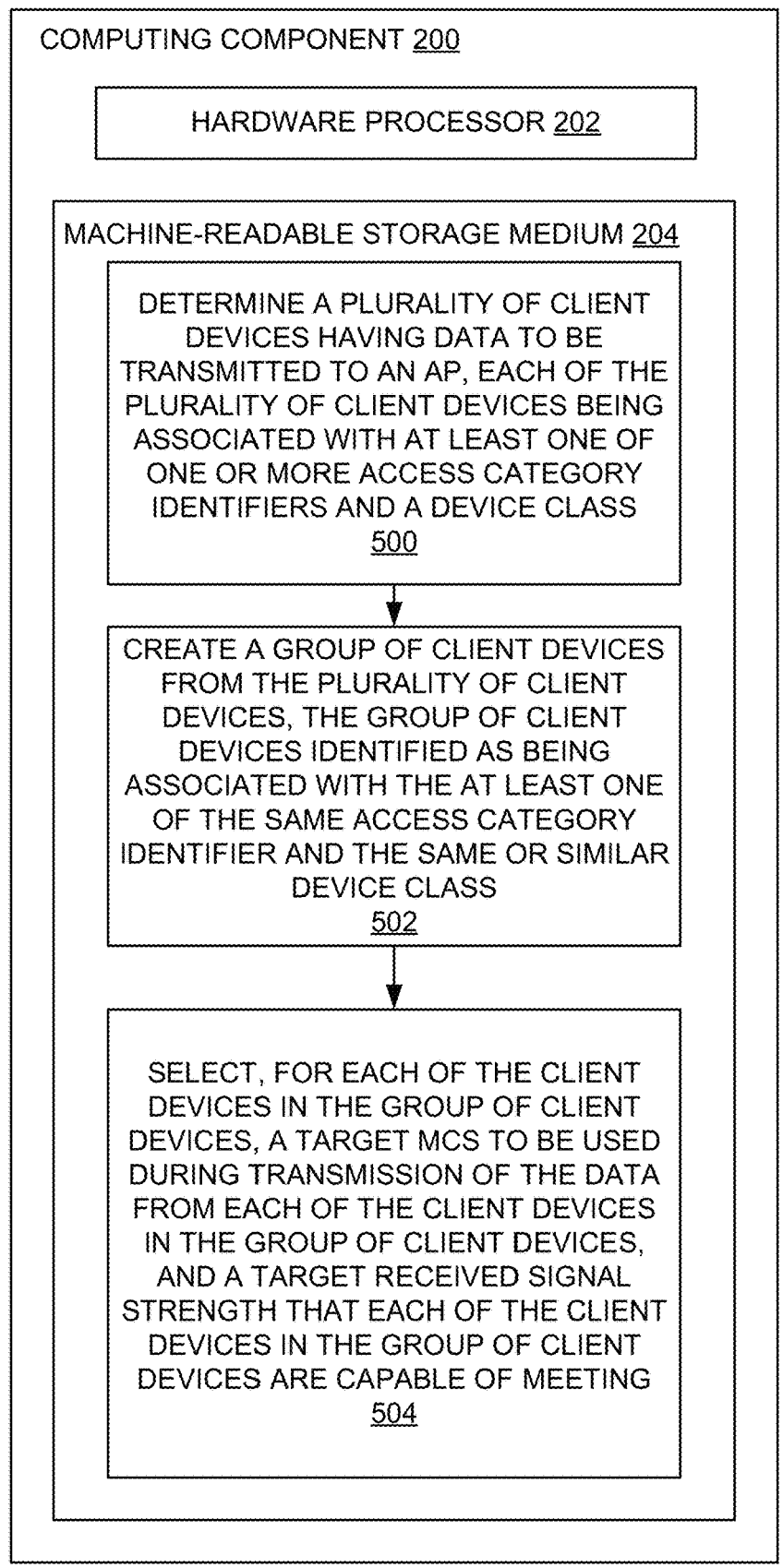
FIG. 5A is a block diagram of an example computing component for creating a UL MU client device grouping in accordance with various embodiments.

FIG. 5A is a block diagram of an example computing component or device 200 for creating a UL MU client device grouping in accordance with various embodiments. In some embodiments, computing component 200 may be the same computing component as that illustrated in FIGS. 2A, 2B, 3A, and/or 4A and described above. In some embodiments, however, a different computing component or partition/part of computing component 200 may be used to determine pathloss as described herein. In some embodiments, hardware processor 202 is the same hardware processor 202 as that illustrated in FIGS. 2A, 2B, 3A, and/or 4A, or in other embodiments, another hardware processor or portion of hardware processor 202 may be used. In some embodiments, machine-readable storage medium 204 is the same machine-readable storage medium as that illustrated in FIGS. 2A, 2B, 3A, and/or 4A, but in other embodiments, another machine-readable storage medium or portion of machine-readable storage medium 204 may be used to store instructions 500-504.

In some embodiments, hardware processor 202 may execute instruction 500 to determine a plurality of client devices having data to be transmitted to an AP, each of the plurality of client devices being associated with at least one of one or more ACIs and a client device class. Hardware processor 202 may execute instruction 502 to create a group of client devices from the plurality of client devices, the group of client devices identified as being associated with the at least one of the same ACI and the same or similar client device class. As noted above, UL traffic compatibility can be determined using the ACI associated with a client device, and UL compatibility premised on the fidelity of a client device transmitter can be determined based on the type (class) of client device being considered. Hardware processor 202 may execute instruction 504 to select, for each of the client devices in the group of client devices, a target MCS to be used during transmission of data, and a target RSSI that each of the client devices in the group of client devices are capable of meeting.

Similar to the aforementioned re-evaluation of pathloss, the UL MCS rate to be used by the client devices grouped together for simultaneous UL MU transmissions may also be re-evaluated and adjusted. That is, once a client device grouping has been established by an AP or AP controller, packet reception success at the AP can be monitored, and the applicable MCS rating for each of the client devices in the grouping can be adjusted to maintain a particular UL packet delivery ratio.

Figure 5B:
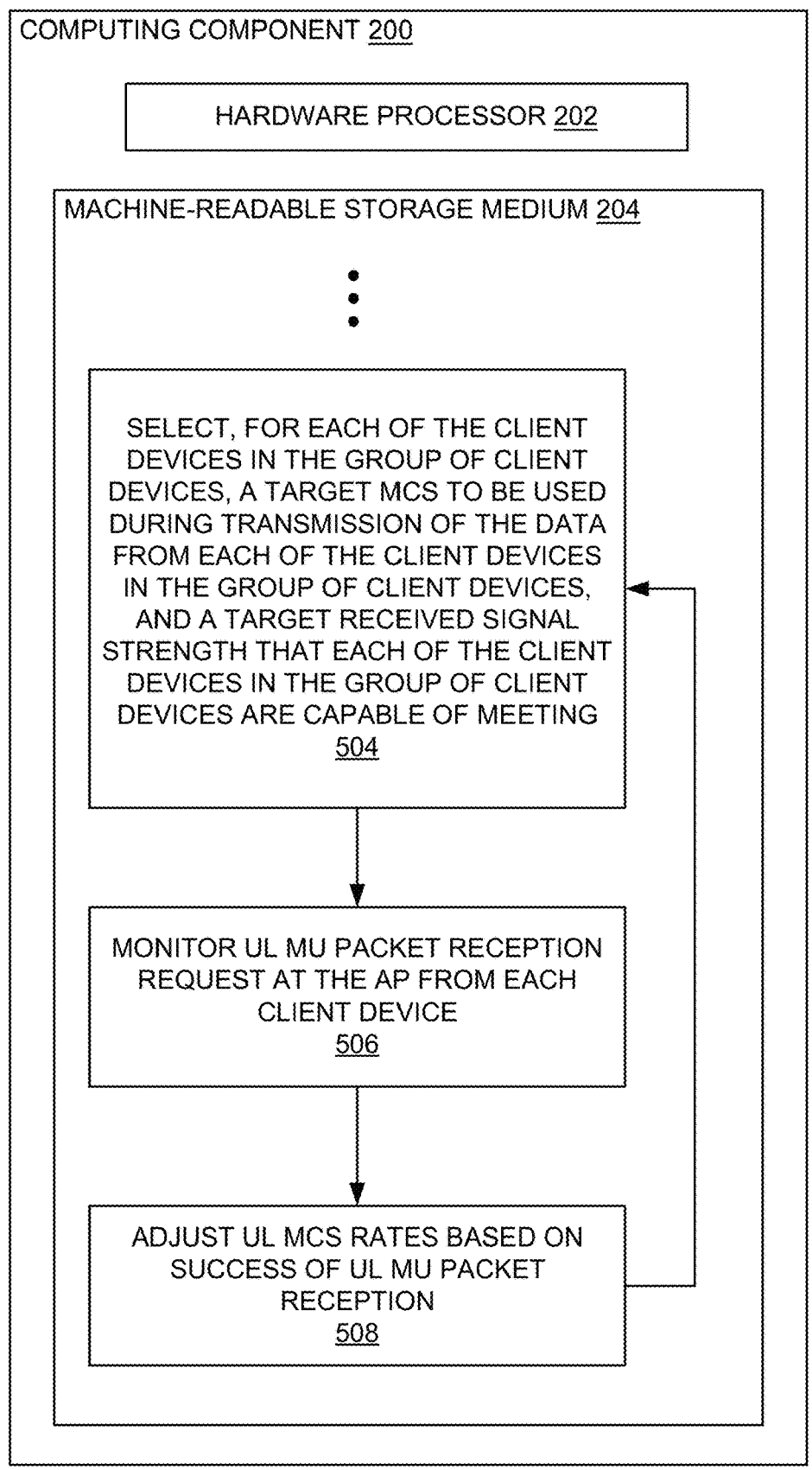
FIG. 5B is a block diagram of an example computing component for adjusting UL MCS for client devices in a UL MU group in accordance with various embodiments.

FIG. 5B is a block diagram of an example computing component or device 200 for adjusting UL MCS for client devices in a UL MU group in accordance with various embodiments. Machine-readable storage medium 204 may be used to store additional instructions 506-508.

For example, subsequent to selecting a target MCS rate and target RSSI (as described above), hardware processor 202 can execute instruction 506 to monitor UL MU packet reception from each client device of the grouping at the AP. That is, after the AP/AP controller has decided upon one or more groupings as described above, and has assigned an UL transmit power (EIRP) to meet the selected target RSSI and MCS per client device as also described above, the AP can monitor the packet reception success from each client device engaged in an UL MU transmission to the AP.

Because UL MU transmissions are triggered by the AP, the AP/AP controller is aware of which client devices will send an UL frame in the next UL MU transmission within a short interframe space (SIFS) time interval. A SIFS time interval can refer to the amount of time required for a wireless interface to process a received frame and respond with an appropriate response frame (for example, the aforementioned trigger and acknowledgement frames).

Hardware processor 202 can execute instruction 508 to adjust the UL MCS rates based on the success of UL MU packet reception. That is, the AP can maintain a desired or initial UL packet delivery ratio for each client device, and adjust the UL MCS rates for subsequent UL MU transmissions from each client device as function of the packet delivery ratio (or conversely packet error rate). In other embodiments, the AP can alternatively use a combination of DL SU/MU transmission rates used by the AP to send data to a particular client device and UL Channel Quality Indicator (CQI) received from the client device. For example, packet delivery ratios/packet error rates can be maintained per MCS rate and used to calculate an expected goodput (e.g., a application-level throughput or number of useful information bits delivered per some unit of time) if that MCS rate is used at those particular packet delivery ratios/packet error rates. The combination of packet delivery ratio/packet error rate and MCS rate that maximizes goodput can be used as target rate. For example, CQI can be used as filtering criteria, e.g., if CQI is above a certain threshold, higher MCS rates can be started with, whereas if CQI is below a certain threshold, higher MCS rates may not be used.

Figure 6:
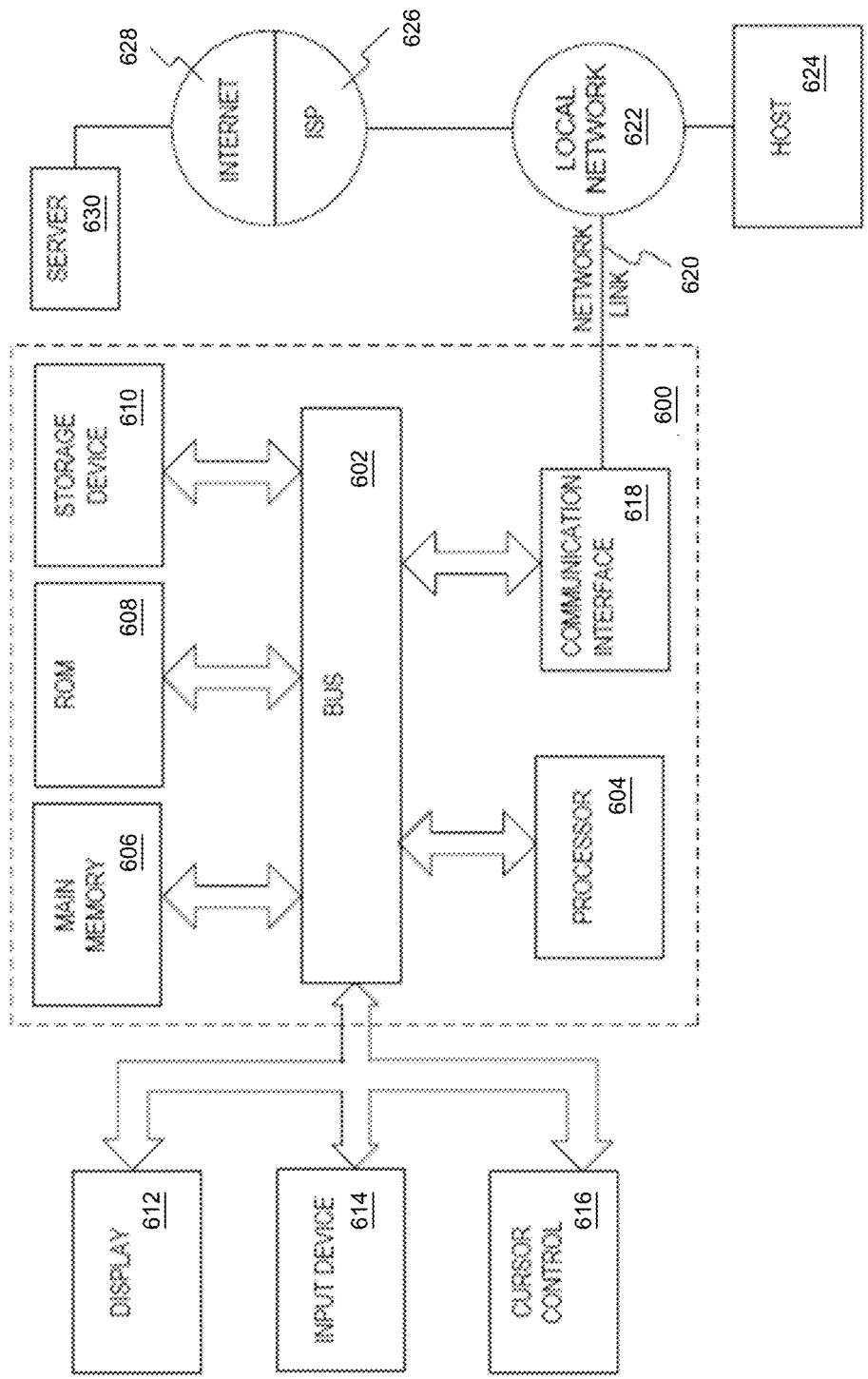
FIG. 6 is an example of a computing component that can be used in conjunction with various embodiments of the present disclosure.

FIG. 6 illustrates an example computing component 600 that may be used to implement various features of the methods disclosed herein. Computing component 200 may be an embodiment of the computing component 600.

Where components of the application are implemented in whole or in part using software, in one embodiment, these software elements can be implemented to operate with a computing or processing component capable of carrying out the functionality described with respect thereto. However, after reading this description, it will become apparent to a person skilled in the relevant art how to implement the application using other computing components or architectures.

As noted above with respect to computing component 200, computing component 600 may represent, for example, computing or processing capabilities found within mainframes, supercomputers, workstations or servers or any other type of special-purpose or general-purpose computing devices as may be desirable or appropriate for a given application or environment. Computing component 600 might also represent computing capabilities embedded within or otherwise available to a given device.

Computing component 600 might include, for example, one or more processors, controllers, control components, or other processing devices, such as a processor 604 (an example embodiment of which is hardware processor 202). Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing component 600 or to communicate externally.

Computing component 600 might also include one or more memory components, simply referred to herein as main memory 608 (an embodiment of which is machine-readable memory 204). For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, an optical disk drive, a CD, DVD, or BLU-RAY drive (R or RW), or other removable or fixed media drive might be provided. Accordingly, storage media 614 might include, for example, a hard disk, a solid state drive, cartridge, optical disk, a CD, a DVD, a BLU-RAY, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a removable memory (for example, a flash memory or other removable memory component) and memory slot, or other fixed or removable storage units 622 and interfaces 620 that allow software and data to be transferred from the storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel an RF link, a network interface, a local or wide area network, and other wired or wireless communications channels.

In this document, the terms "computer readable medium", "computer usable medium" and "computer program medium" are used to generally refer to non-transitory mediums, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "component" does not imply that the elements or functionality described or claimed as part of the component are all configured in a common package. Indeed, any or all of the various components of a component, whether control logic or other components, can be combined in a single package or separately maintained and can further be distributed in multiple groupings or packages or across multiple locations.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Additionally, with regard to flow diagrams, operational descriptions and instructions, or method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A non-transitory machine-readable storage medium encoded with instructions executable by a hardware processor of a computing component, the machine-readable storage medium comprising instructions to cause the hardware processor to:
   receive, at an access point (AP) in a wireless local area network (WLAN), a maximum transmit power capability of a client device that can communicate with the AP over a plurality of radio communication channels;
   aggregate, at the AP or a controller of the AP, a plurality of maximum transmit power capability values for the client device received from a plurality of APs communicating with the client device over a period of time;
   compute, at the AP or the controller of the AP, the client device's effective maximum transmit power as a minimum value of the plurality of maximum transmit power capability values of the client device across a plurality of radio channels over which the client device operates;
   receive, at the AP, an uplink power headroom for the client device communicating with the AP; and
   calculate at the AP or the controller of the AP, an uplink pathloss between the client device and the AP by subtracting the uplink power headroom and a received signal strength indicator (RSSI) measured at the AP for the client device from the sum of the effective maximum transmit power and an antenna gain of the AP.

2. The non-transitory machine-readable storage medium of claim 1, the instructions further cause the hardware processor to determine the maximum transmit power capability for the channel of operation from an association request frame transmitted by the client device to the AP.

3. The non-transitory machine-readable storage medium of claim 1, wherein the instructions causing the hardware processor to compute the effective maximum transmit power capability further cause the hardware processor to determine one of a smallest maximum transmit power capability for the channel of operation, mean maximum transmit power capability for the channel of operation, and an average maximum transmit power capability for the channel of operation.

4. The non-transitory machine-readable storage medium of claim 1, wherein the instructions further cause the hardware processor to obtain the uplink power headroom from a high efficiency variant of a high throughput control field in a frame transmitted by the client device to the AP.

5. The non-transitory machine-readable storage medium of claim 4, wherein the uplink power headroom comprises an uplink power headroom at a lowest modulation coding scheme (MCS) rate commensurate with a transmit error vector magnitude (EVM) limit, the uplink power headroom being requested from the client device to be transmitted to the AP while using the lowest MCS rate.

6. The non-transitory machine-readable storage medium of claim 1, wherein the instructions further cause the hardware processor to re-evaluate the uplink pathloss based on one more changes regarding at least one of each of the plurality of client devices and operating characteristics of the WLAN.

7. The non-transitory machine-readable storage medium of claim 6, wherein the one or more changes regarding each of the plurality of client devices comprise at least one of a change in uplink signal-to-noise ratio (SNR) associated with the AP.

8. The non-transitory machine-readable storage medium of claim 7, wherein the instructions further cause the hardware processor to initiate re-evaluation of the uplink pathloss upon experiencing a change in the uplink SNR that meets or exceeds and uplink SNR threshold.

9. The non-transitory machine-readable storage medium of claim 6, wherein the one or more changes regarding the operating characteristics of the WLAN comprises at least one of a change in uplink SNR to multiple APs within the WLAN, a change in types of client devices associated with the AP, and a change in traffic flow in the WLAN.

10. The non-transitory machine-readable storage medium of claim 1, wherein the instructions further cause the hardware processor to calculate at the AP, an uplink pathloss between the AP and additional client devices associated with the AP.

11. The non-transitory machine-readable storage medium of claim 10, wherein the instructions further cause the hardware processor to select a subset of client devices from a group of client devices comprising the client device and the additional client devices based upon at least one of uplink traffic compatibility of data to be transferred from the subset of client devices to the AP and a device class within which each client device of the subset of client devices belongs.

12. An access point (AP) operating in a wireless local area network (WLAN), comprising a non-transitory machine-readable storage medium encoded with instructions executable by a hardware processor, the machine-readable storage medium comprising instructions to cause the hardware processor to:
- determine a plurality of client devices having data to be transmitted to the AP, each of the plurality of client devices being associated with at least one of one or more access category identifiers and a device class;
- create a group of client devices from the plurality of client devices for uplink multi-user transmission, the group of client devices identified as being associated with at least one of the same access category identifier and the same or similar device class;
- calculate, for each client device in the group of client devices, an uplink pathloss from each client device to the AP;
- create a subgroup of client devices from the group of client devices comprising client devices having a similar uplink pathloss to the AP;
- select and assign, for each of the client devices in the subgroup of client devices, a target modulation coding scheme (MCS) to be used during transmission of the data from each of the client devices in the subgroup of client devices, and a target received signal strength at the AP that each of the client devices in the subgroup of client devices are capable of meeting;
- monitor an uplink multi-user packet reception success rate from each of the client devices in the subgroup of client devices; and
- adjust the target modulation coding scheme as a function of the uplink multi-user packet reception success rate.

13. The AP of claim 12, wherein the instructions causing the hardware processor to calculate the uplink pathloss from each client device in the subgroup of client devices to the AP further causes the hardware processor to:
- calculate an effective maximum transmit power as a function of a per-channel maximum transmit power capability of each client device in the subgroup of client devices across a plurality of radio channels over which each of the client devices operate; and
- calculate at the AP, the uplink pathloss between each client device in the subgroup of client devices and the AP, the uplink pathloss being a function of each of the client device's effective maximum transmit power, each of the client device's uplink power headroom, a received signal strength received at the AP for each of the client device's, and an antenna gain of the AP.

14. The AP of claim 13, wherein the instructions causing the hardware processor to compute each client device's effective maximum transmit power capability further cause the hardware processor to determine one of a smallest per-channel maximum transmit power capability, mean per-channel maximum transmit power capability, and an average per-channel maximum transmit power capability.

15. The AP of claim 12, wherein the instructions further cause the hardware processor to re-evaluate the uplink pathloss based on one more changes regarding at least one client device in the subgroup of client devices and operating characteristics of the WLAN.

16. A method, comprising:
- identifying, at an access point (AP) or a controller of the AP, the AP operating in a wireless local area network (WLAN), one or more client devices that are associated with at least one of the same access category identifier and the same or similar device class;
- grouping together, for uplink transmission purposes, those client devices that are associated with at least one of the same access category identifier and the same or similar device class;
- calculating, for each client device in the grouping of client devices, an uplink pathloss from each client device to the AP;
- creating a subgroup of client devices from the grouping of client devices comprising client devices having a similar uplink pathloss to the AP;
- selecting and assigning, for each of the client devices in the subgroup of client devices, a target modulation coding scheme (MCS) to be used during uplink transmission of data from each of the client devices in the subgroup of client devices, and a target received signal strength at the AP that each of the client devices in the subgroup of client devices are capable of meeting;
- monitoring an uplink multi-user packet reception success rate from each of the client devices in the subgroup of client devices; and
- adjusting the target modulation coding scheme as a function of the uplink multi-user packet reception success rate.

17. The method of claim 16, wherein calculating the uplink pathloss from each client device in the subgroup of client devices to the AP comprises calculating an effective maximum transmit power as a function of a per-channel maximum transmit power capability of each client device in the subgroup of client devices across a plurality of radio channels over which each of the client devices operate.

18. The method of claim 17, wherein the uplink pathloss is a function of each of the client device's effective maximum transmit power, each of the client device's uplink power headroom, a received signal strength received at the AP for each of the client device's, and an antenna gain of the AP.

19. The method of claim 18, wherein computing each client device's effective maximum transmit power capability comprises determining one of a smallest per-channel maximum transmit power capability, mean per-channel maximum transmit power capability, and an average per-channel maximum transmit power capability.

20. The method of claim 16, further comprising re-evaluating the uplink pathloss based on one more changes regarding at least one client device in the subgroup of client devices and operating characteristics of the WLAN.

* * * * *